United States Patent
Naya et al.

(10) Patent No.: US 9,245,218 B2
(45) Date of Patent: Jan. 26, 2016

(54) IMAGE FORMING APPARATUS, CONTROL METHOD OF IMAGE FORMING APPARATUS AND STORAGE MEDIUM

(71) Applicant: CANON KABUSHIKI KAISHA, Tokyo (JP)

(72) Inventors: Yuji Naya, Kawasaki (JP); Keishi Inaba, Yokohama (JP); Koji Shimizu, Tokyo (JP); Kohei Asano, Yokohama (JP); Kiyokazu Umimura, Kawasaki (JP); Yuichi Konosu, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/479,168

(22) Filed: Sep. 5, 2014

(65) Prior Publication Data

US 2015/0022858 A1    Jan. 22, 2015

Related U.S. Application Data

(63) Continuation of application No. 13/482,677, filed on May 29, 2012, now Pat. No. 8,842,318.

(30) Foreign Application Priority Data

Jun. 1, 2011  (JP) ................................ 2011-123476

(51) Int. Cl.
  *G06F 15/00*  (2006.01)
  *G06K 15/00*  (2006.01)
  *G03G 15/00*  (2006.01)
  *G06F 3/12*   (2006.01)

(52) U.S. Cl.
  CPC .......... *G06K 15/406* (2013.01); *G03G 15/5004* (2013.01); *G06F 3/1217* (2013.01); *G06F 3/1229* (2013.01)

(58) Field of Classification Search
  CPC ........... H04N 1/00896; H04N 1/00904; G06F 3/1285
  USPC ....................................................... 358/1.15
  See application file for complete search history.

(56) References Cited

U.S. PATENT DOCUMENTS

2007/0240159 A1* 10/2007 Sugiyama .......... H04N 1/00885
                                                        718/102

FOREIGN PATENT DOCUMENTS

| CN | 1497411 A    | 5/2004  |
| CN | 101005551 A  | 7/2007  |
| JP | 2003248580 A | 9/2003  |
| JP | 2010234726 A | 10/2010 |
| JP | 2010269496 A | 12/2010 |

* cited by examiner

*Primary Examiner* — Saeid Ebrahimi Dehkordy
(74) *Attorney, Agent, or Firm* — Canon USA, Inc. I.P. Division

(57) ABSTRACT

An image forming apparatus capable of communicating with a server apparatus, includes a receiving unit configured to receive a packet from the server apparatus, a determining unit configured to determine whether a packet received by the receiving unit is a specific packet, a power supply control unit which, when the determining unit determines that a packet received by the receiving unit is the specific packet, brings the image forming apparatus into a first power condition which enables the image forming apparatus to start quickly using data stored in a volatile memory, and a start control unit configured to start the image forming apparatus quickly using data stored in the volatile memory.

10 Claims, 9 Drawing Sheets

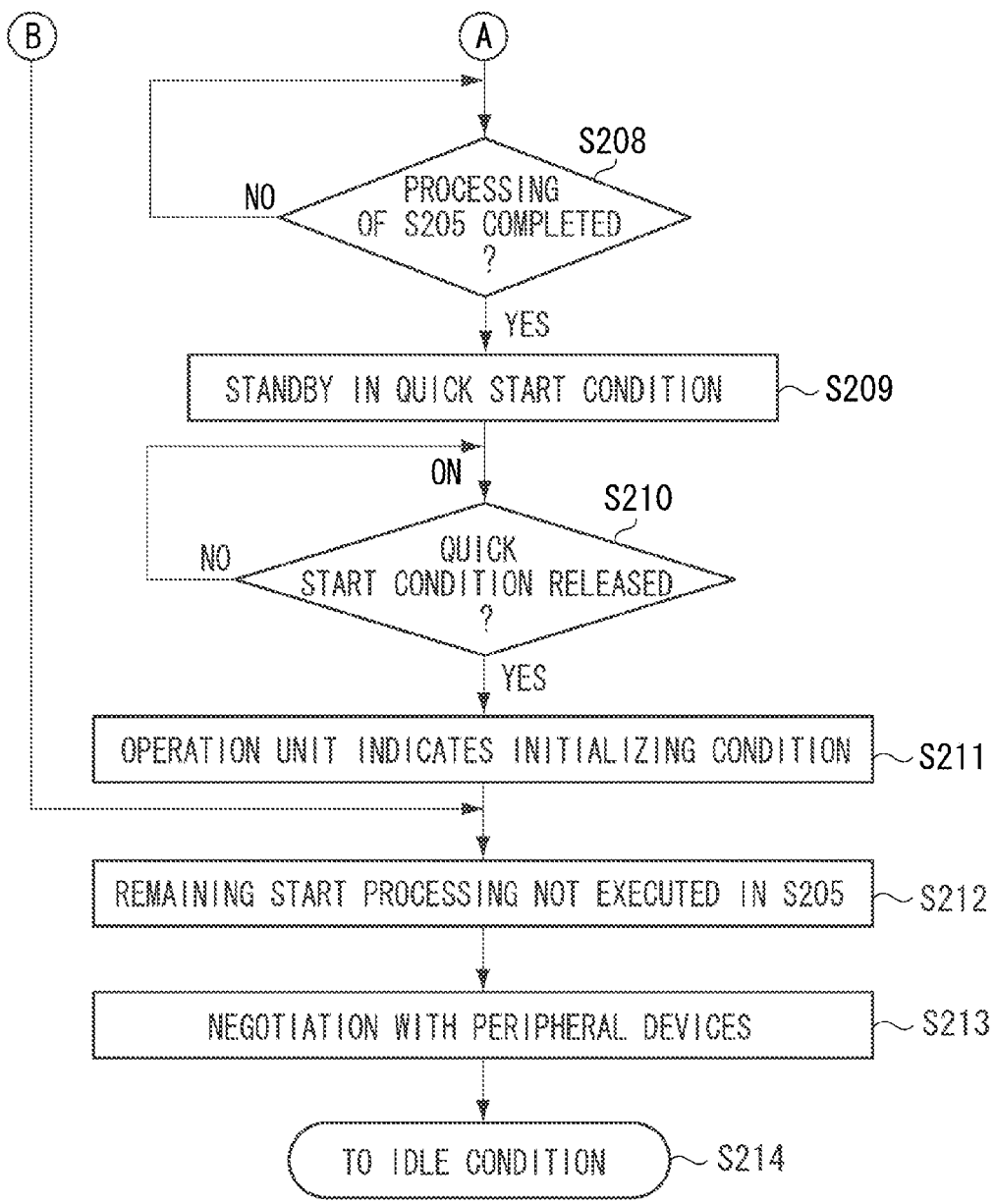

IMAGE FORMING APPARATUS, CONTROL METHOD OF IMAGE FORMING APPARATUS AND STORAGE MEDIUM

CROSS REFERENCE OF RELATED APPLICATIONS

This application is a continuation of U.S. application Ser. No. 13/482,677 filed May 29, 2012 which claims priority from Japanese Patent Application No. 2011-123476 filed Jun. 1, 2011, each of which is hereby incorporated by reference herein in its entirety.

BACKGROUND OF THE INVENTION

1. Field of the Invention

The present invention relates to an image forming apparatus, a control method of the image forming apparatus and a storage medium therefor.

2. Description of the Related Art

With respect to a method for controlling power-on of an image forming apparatus through remote control using a server apparatus, a technology for starting the image forming apparatus up to an idle condition has been already established. In the idle condition, all functions of the image forming apparatus can be used. As disclosed in Japanese Patent Application Laid-Open No. 2000-89864, a technology for controlling whether the system should be turned into the idle condition or should be powered off according to system setup information of the apparatus is available.

According to a remote control power-on system, ordinarily, the server apparatus automatically turns on electric power of the image forming apparatus when a set time comes. However, when the image forming apparatus is automatically powered on according to this system, there is a low possibility that a user who wants to use it immediately is present near the image forming apparatus and thus, it may take time after the image forming apparatus is automatically powered on until when the image forming apparatus is actually used by a user. Therefore, the image forming apparatus stands by in the idle condition even when it is not used immediately, thereby consuming electric power in waste in this period.

On the other hand, even if a user does not intend to use the image forming apparatus immediately, he or she may expect the image forming apparatus to get into an operable condition quickly when he or she wishes to use it. However, when the server apparatus turns on electric power of the image forming apparatus, the user cannot choose whether the image forming apparatus should be started in the idle condition or in the quick start condition, which is a problem to be solved by the present invention.

SUMMARY OF THE INVENTION

According to an aspect of the present invention, an image forming apparatus capable of communicating with a server apparatus, includes a receiving unit configured to receive a packet from the server apparatus, a determining unit configured to determine whether a packet received by the receiving unit is a specific packet, a power supply control unit which, when the determining unit determines that a packet received by the receiving unit is the specific packet, brings the image forming apparatus into a first power condition which enables the image forming apparatus to start quickly using data stored in a volatile memory, and a start control unit configured to start the image forming apparatus quickly using data stored in the volatile memory.

According to the above-described configuration, depending on a packet acquired from the server apparatus, the start processing of the image forming apparatus can be executed in the idle condition or in the quick start condition, which improves an effect of energy saving.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A & 7B are flow charts describing a control method of the image forming apparatus.

DESCRIPTION OF THE EMBODIMENTS

Various exemplary embodiments, features, and aspects of the invention will be described in detail below with reference to the drawings.

The components described in the following exemplary embodiments are just exemplifications and are not intended to restrict the scope of the present invention to only those components.

<Description of System Configuration>

Figure 1:
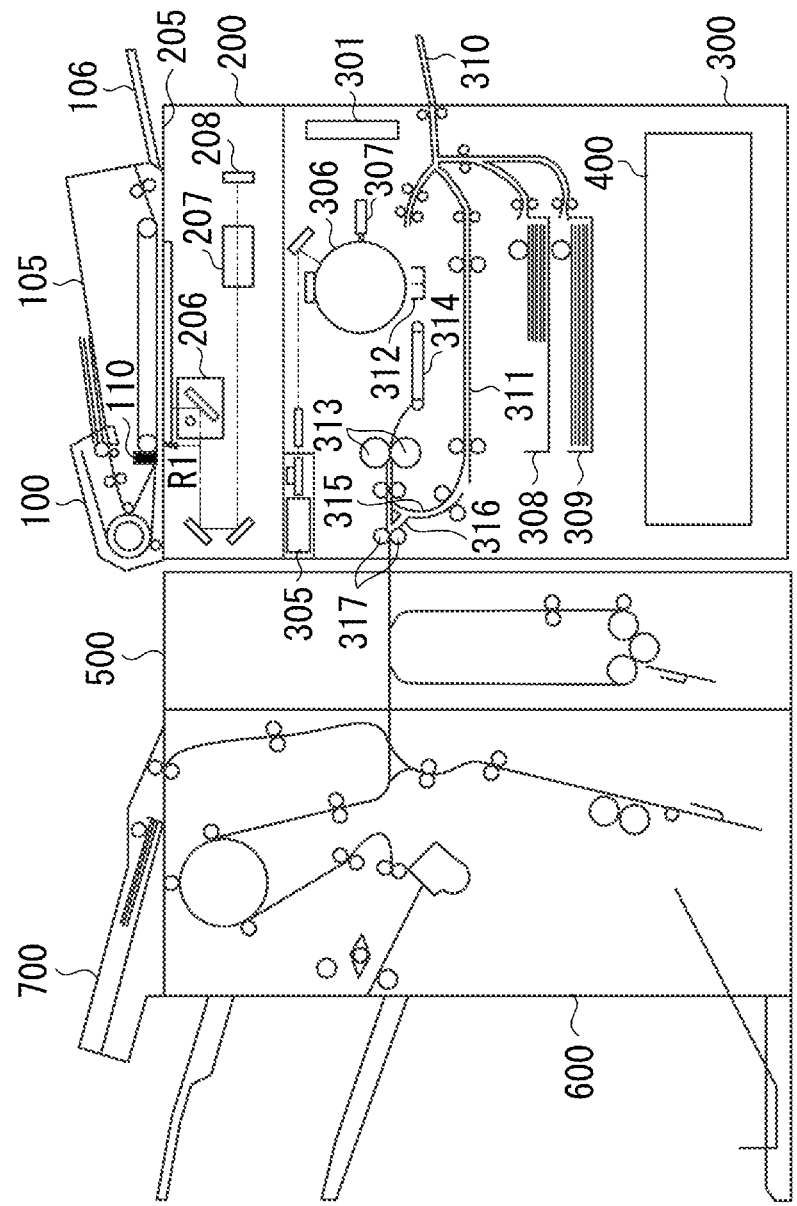
FIG. 1 is a diagram illustrating a configuration of an image forming apparatus according to the present exemplary embodiment.

FIG. 1 is a diagram illustrating a configuration of an image forming apparatus according to a first exemplary embodiment of the present invention. The image forming apparatus of the present exemplary embodiment includes an image forming apparatus main body constituted of an image reader 200 and a printer unit 300, a folding apparatus 500, and a finisher 600. A document conveyance apparatus 100 is mounted on the top of the image reader 200. An inserter 700 is provided on the top of the finisher 600. The image forming apparatus is constructed to be capable of communicating with a server apparatus 453 through a communication control unit 450 described below and acquires a packet for controlling start processing described below.

Referring to FIG. 1, the document conveyance apparatus 100 feeds document papers set on a document tray 105 one by one from a head page and carries the papers onto a document positioning glass plate via a curved path. Two reading modes are available for reading a one-sided original document. In an original fixed-reading mode (first reading mode), a rear end of the original document is fed to and stopped at a reading position R1 on the document positioning glass plate 205, and a scanner unit 206 is moved from the left to the right to read the document. According to another reading mode (second reading mode), an original document is carried up to the reading position R1 at a specific reading speed, and the original document is read with the scanner unit 206 fixed at the reading position R1. In any mode, after the original document is read, the original document is discharged onto a discharge tray 106.

According to a two-sided original reading method, the front surface of the original document is read by the scanner unit 206 and the rear surface is read by an optical unit 110 arranged inside the document conveyance apparatus 100. A detailed description of this matter will be made below. An image sensor and a light source (not shown) are arranged inside the optical unit 110.

An image of an original document read by the image sensor 208 via the lens 207 is sent to an exposure control unit 305 via a printer control unit 301. The exposure control unit 305 outputs laser beam corresponding to an image signal. A photosensitive drum 306 is irradiated with the laser beam to form an electrostatic latent image on the photosensitive drum 306. The electrostatic latent image on the photosensitive drum 306 is developed by a developing device 307 and developer existing on the photosensitive drum 306 is transferred onto a sheet carried from any one of cassettes 308, 309, a manual feed unit 310, and a two-sided conveyance path 311, at a transfer unit 312.

After developer is transferred onto the sheet, the sheet is guided to a fixing unit 313, in which fixing processing of the developer is executed. After passing the fixing unit 313, the sheet is guided to a path 314 from a path 315 by a flapper (not shown). After the rear end of the sheet passes the path 315, the sheet is switched back and guided to discharge rollers 317. Consequently, with a surface to which the developer adheres, facing downward (face down status), the sheet can be discharged from the printer unit 300 by the discharge rollers 317. This is called inversed discharge. Because the sheet is discharged with its face down, when printing images read from a plurality of original documents by the document conveyance apparatus 100, the images can be formed in a right order from the head page.

When forming an image on a hard sheet like an OHP sheet supplied through the manual feed unit 310, the sheet is not guided to the path 315 but is discharged through the discharge rollers 317 with a surface to which the developer adheres, facing upward (face up status).

When forming an image on both surfaces of a sheet, the sheet is guided from the fixing unit 313 to the path 315 and the path 314. Just after the sheet passes the path 315, the sheet is switched back and guided to a two-sided conveyance path 311 by a flapper (not shown). An electrostatic latent image is transferred to the sheet guided onto the two-sided conveyance path 311 by the transfer unit 312 and the fixing processing is executed by the fixing unit 313.

Setup of a path length, arrangement of rollers and division of a drive system enable conveyance of sheets even if five sheets of half size papers such as A4 size, B5 size exist on a path of a single circulation, from the transfer unit 312 via the two-sided conveyance path 311, back to the transfer unit 312 again. Because the sheets are discharged with their odd-pages facing downward, the sheet pages can be arranged in a proper order at the time of two-sided copy.

Figure 2:
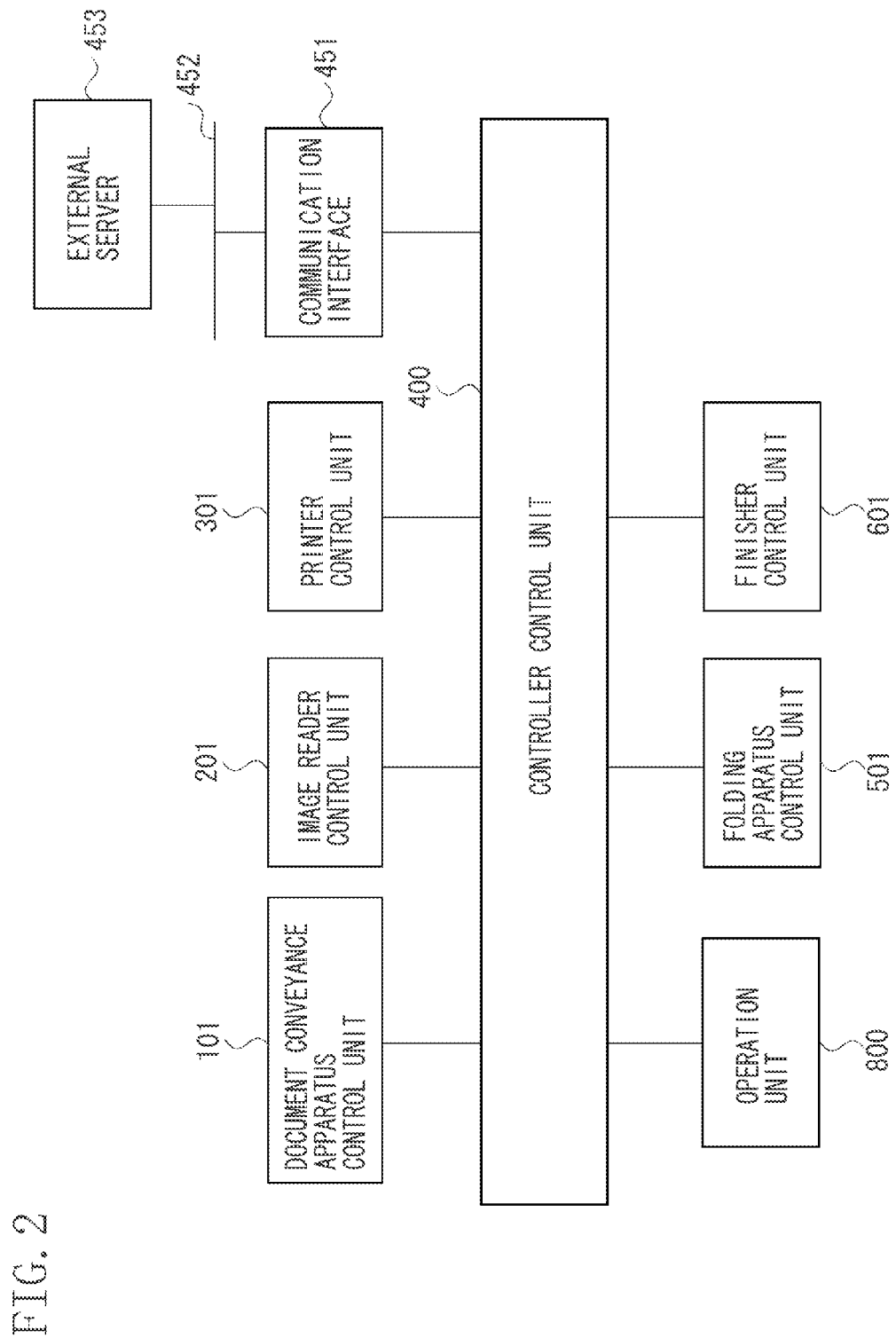
FIG. 2 is a block diagram illustrating an entire configuration of a control unit of the image forming apparatus illustrated in FIG. 1.

The sheets discharged from the discharge rollers 317 are fed into the folding apparatus 500. The folding apparatus 500 executes a processing of folding the sheet into Z-shape. When folding processing is specified for a sheet of A3 size or B4 size, after the folding processing is executed, the sheet is fed into the finisher 600. Sheets of other sizes are fed into the finisher 600 without any treatment. The finisher 600 executes bookbinding processing, stapling processing and perforating processing. An inserter 700 is mounted on the top of the finisher 600 to supply a cover and an interleaf. A controller control unit 400 communicates with the image reader 200, the printer 300, the folding apparatus 500, and the finisher 600 to control the entire image forming apparatus. FIG. 2 is a block diagram illustrating the entire configuration of the control unit of the image forming apparatus illustrated in FIG. 1. This apparatus is constructed around the controller control unit 400 configured to control the entire image forming apparatus.

Referring to FIG. 2, the controller control unit 400 has a document conveyance apparatus control unit 101 configured to control the document conveyance apparatus 100 according to a setting of the operation unit 800 or an instruction from the server apparatus 453. The controller control unit 400 communicates with an image reader control unit 201 configured to control the image reader 200 to obtain image data of an input original document. Further, the controller control unit 201 communicates with a printer control unit 301 configured to control the printer 300 and prints the image data on a sheet. Additionally, the controller control unit 201 communicates with a folding apparatus control unit 501 configured to control the folding apparatus 500 and a finisher control unit 601 configured to control the finisher 600 to achieve desired outputs such as stapling printed sheets and punch-out of holes.

Figure 3:
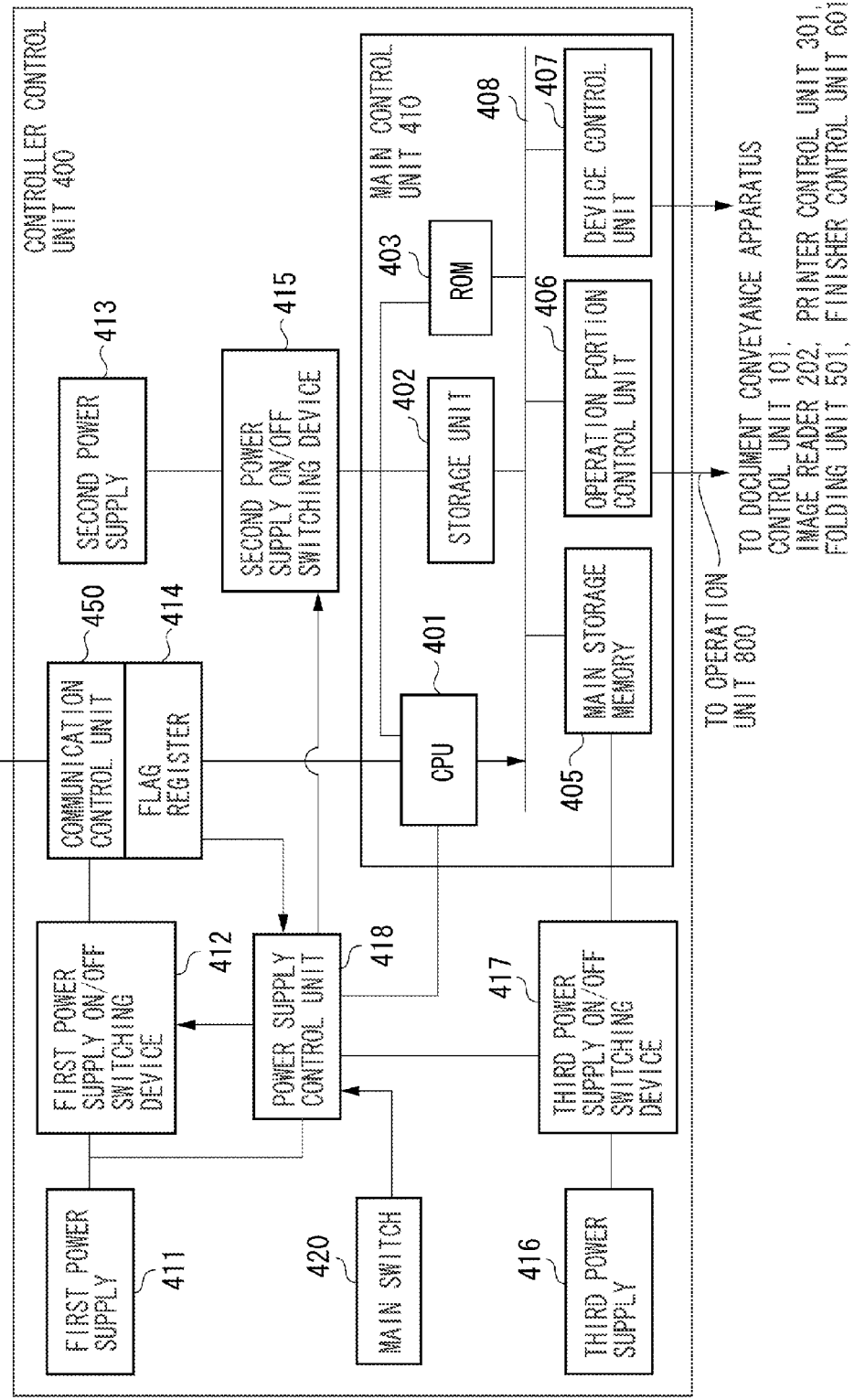
FIG. 3 is a block diagram illustrating a configuration of a controller control unit illustrated in FIG. 2.

A communication interface 451 is an interface 4 configured to connect the server apparatus 453 with the controller control unit, for example, through an external bus 452 such as a network and USB to rasterize print data supplied from the server apparatus 453 and output the processed data. FIG. 3 is a block diagram illustrating the configuration of the controller control unit illustrated in FIG. 2.

Referring to FIG. 3, the controller control unit 400 is controlled by a CPU 401 within a main control unit 410 and is controlled by an operating system (hereinafter referred to OS). A bus bridge 408 is connected to a ROM 403 which stores an initial start program of the CPU 401 and a main storage memory (main memory) 405 which stores control data of the CPU 401 temporarily and is used as a work area for calculation accompanying a control.

A storage unit 402 stores a main program including the operating system of the CPU 401. The storage unit 402 is also used as a temporary storage area for image data when the image forming apparatus of the present exemplary embodiment is activated. Further, the communication control unit 450 configured to control a network and a USB interface and an operation portion control unit 406 configured to control the operation unit 800 are connected to the CPU 401.

The CPU 401 communicates with a device control unit 407 through the bus bridge 408. The device control unit 407 is connected to the document conveyance apparatus control unit 101, the image reader control unit 201, the printer control unit 301, the folding apparatus control unit 501, and the finisher control unit 601 to control those components.

A power supply control unit 418 controls power of the entire image forming apparatus. More specifically, the power supply control unit 418 controls power for the document conveyance apparatus control unit 101, the image reader control unit 201, the printer control unit 301, the folding apparatus control unit 501 and the finisher control unit 601 and performs power control in an energy saving mode within the controller control unit 400.

A first power supply ON/OFF switching device 412 switches ON/OFF a first power supply 411 for supplying power to the communication control unit 450. A second power supply ON/OFF switching device 415 switches ON/OFF a second power supply 413 for supplying power to the CPU 401, the storage unit 402, and the ROM 403 within the controller control unit 400.

A third power supply ON/OFF switching device 417 switches ON/OFF a third power supply 416 for supplying power to the main storage memory 405 within the controller control unit 400. The communication control unit 450 is connected to the first power supply ON/OFF switching device 412 to assess a packet received through the communication interface 451 and control a flag register 414.

A main switch 420 notifies the power supply control unit 418 that the system has been operated directly by a user. The main switch 420 instructs the power supply control unit 418 to turn on power. Then, upon receiving a power ON instruction from the main switch 420 in quick start condition, the CPU 401 executes control to bring the image forming apparatus from the quick start condition to an idle condition according to a procedure illustrated in FIGS. 6 and 7. In the meantime, the power supply control unit 418 permits supply of power from the first to third power supplies in the idle condition described in detail below to bring the image forming apparatus into a state allowing formation of images.

Figure 4:
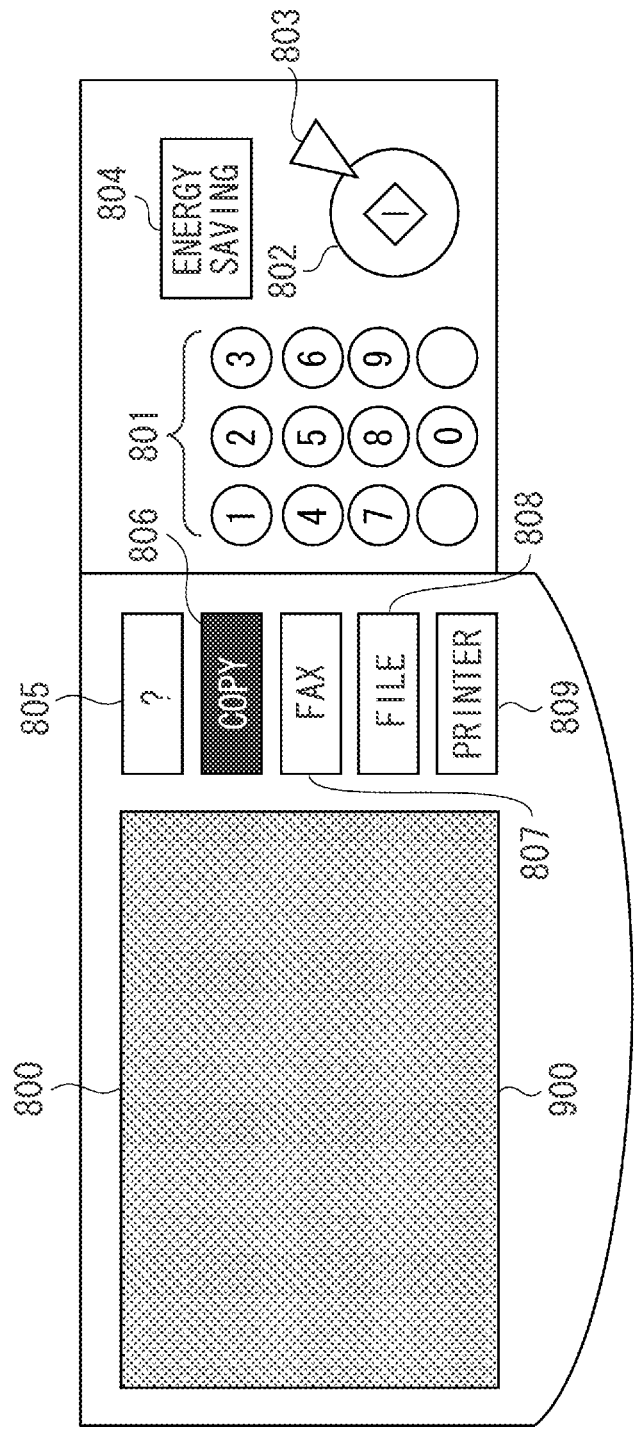
FIG. 4 is a diagram illustrating a configuration of an operation unit of the image forming apparatus illustrated in FIG. 2.

FIG. 4 is a diagram illustrating the configuration of the operation unit 800 of the image forming apparatus illustrated in FIG. 2. Referring to FIG. 4, in a liquid crystal device (LCD) display unit 900, a touch panel sheet is attached to its LCD panel. The touch panel sheet displays an operation screen for the system, and when a displayed key is pressed by a user, the operation unit 800 notifies the controller control unit 400 of its position information. A ten key keypad 801 is used for entering numbers like a number of copies. A start key 802 is used for starting copy operation or document reading operation after a user sets a desired condition. A stop key 803 is used for stopping an operation being currently carried out. An energy saving key 804 is used for transition to energy saving mode or return to the energy saving mode.

If a user presses a guide key 805 when the user is not sure of the function of any key, a description of that key is shown. A copy mode key 806 is used to execute a copy. A fax key 807 is used to make a setting about the fax. A file key 808 is used to output file data. A printer key 809 is used to make a setting about print output from an external apparatus such as a computer.

Figure 5:
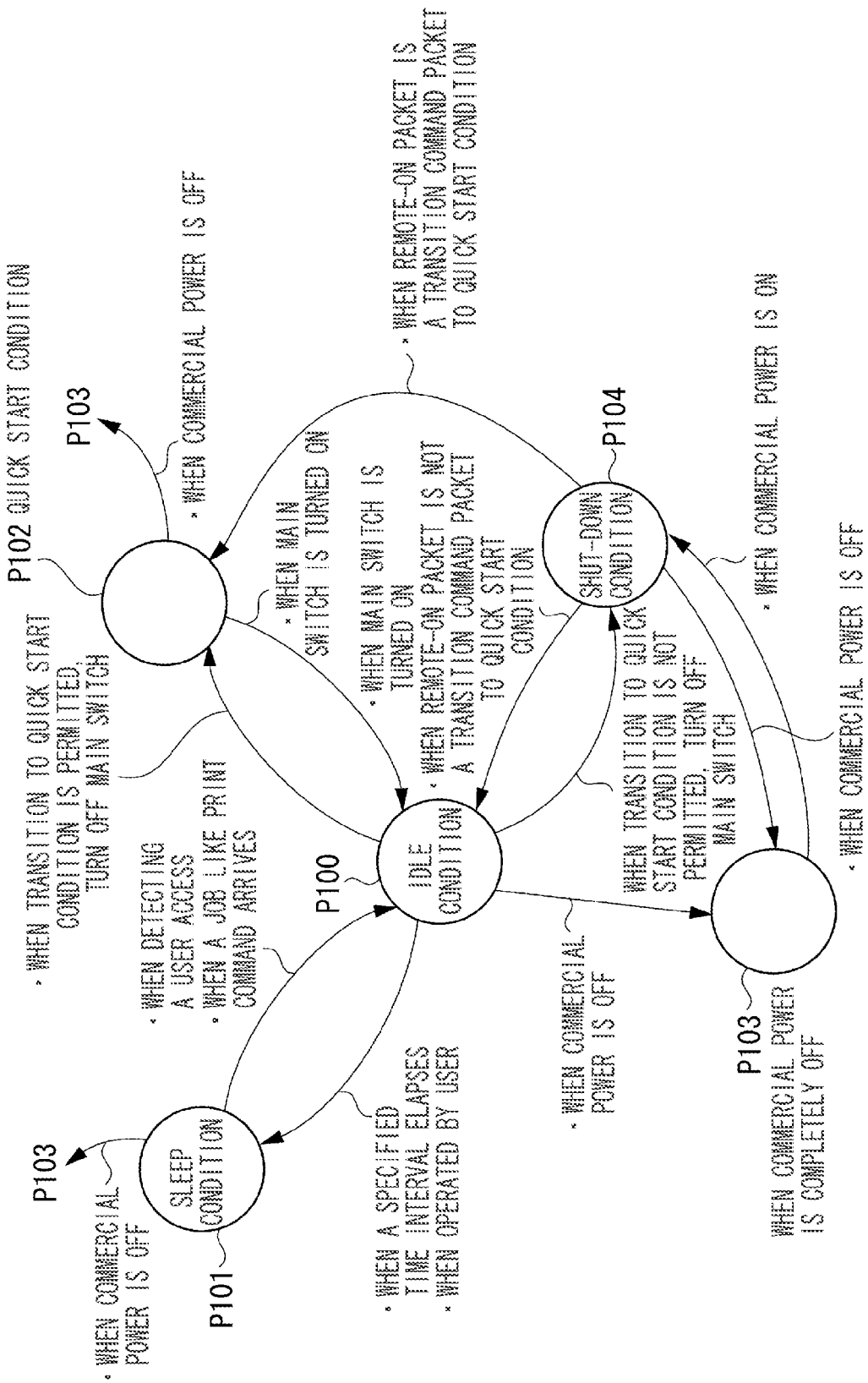
FIG. 5 is a diagram illustrating a transition condition of the power supply of the image forming apparatus of the exemplary embodiment.

FIG. 5 is a diagram illustrating a condition transition of the power supply of the image forming apparatus according to the exemplary embodiment.

When the commercial power (AC plug) is OFF, in P103, the entire apparatus is turned OFF. Because no power is supplied to the apparatus at this time, it cannot accept any electrical operation.

If the commercial power is turned ON when the entire system is OFF (P103), the system is brought to the shut-down condition (P104). At this time, the power supply control unit 418 is powered on. Next, the power supply control unit 418 switches ON the first power supply ON/OFF switching device 412. Consequently, the communication control unit 450 starts to receive a remote ON packet from the server apparatus 453.

If a packet of transition command to the quick start condition (P102) comes from the server apparatus 453 in the shut-down condition (P104), the image forming apparatus is brought to the quick start condition (P102). Upon receiving a power OFF instruction from the main switch 420 in the quick start condition, the CPU 401 brings the image forming apparatus from the idle condition to the quick start condition. At this time, the power supply control unit 418 turns ON the third power supply ON/OFF switching device 417, so that, in the main control unit 410, only the main storage memory 405 and the power supply control unit 418 are powered on.

If a user turns ON the main switch 420 when in the quick start condition (P102), the image forming apparatus is brought to the idle condition (P100). Upon receiving a power supply ON instruction from the main switch 420 in the quick start condition, the image forming apparatus is brought from the quick start condition to the idle condition. In this idle condition, the first power supply ON/OFF switching device 412, the second power supply ON/OFF switching device 415, and the third power supply ON/OFF switching device 417 all remain ON.

Further, the operation portion control unit 406 and the device control unit 407 are also powered on so that the image forming apparatus is entirely activated.

When a predetermined time set in the image forming apparatus elapses in the idle condition (P100), the image forming apparatus is brought to a sleep condition (P101). In this condition, although the first power supply ON/OFF switching device 412 and the third power supply ON/OFF switching device 417 are kept ON, the entire system except the main storage memory 405 within the controller control unit 400 is kept OFF.

Hereinafter, a remote power control method of the image forming apparatus of the present exemplary embodiment and its usage method will be described in detail below. According to the present exemplary embodiment, the communication control unit 450 determines whether a packet acquired by the communication control unit 450 is a packet for activating the image forming apparatus main body in the idle condition which allows formation of an image, or a packet for activating the image forming apparatus main body in the quick start condition which restricts any operation except supplying power to the main memory.

Figure 6:
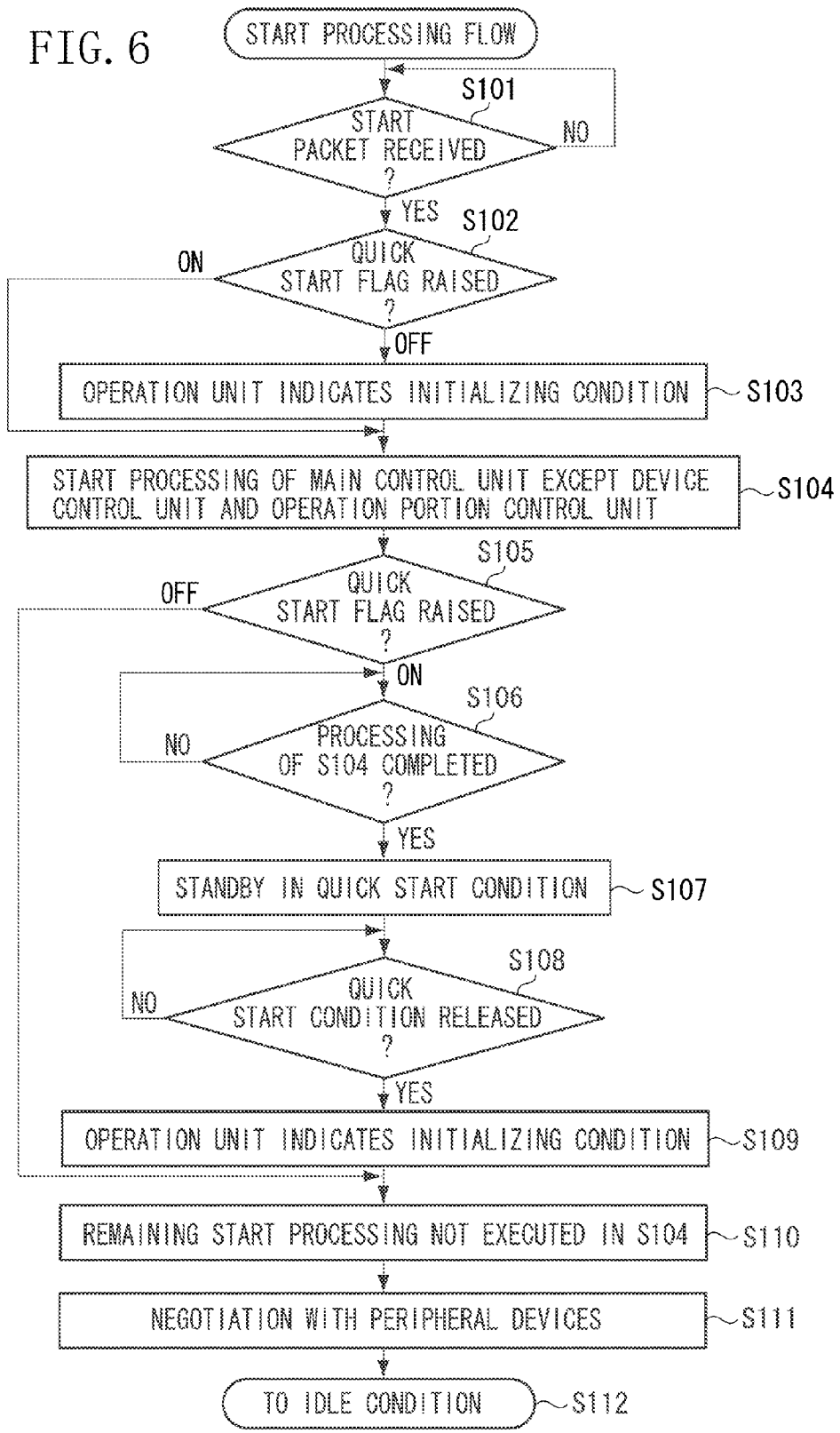
FIG. 6 is a flow chart describing a control method of the image forming apparatus.

FIG. 6 is a flow chart describing a control method of the image forming apparatus of the present exemplary embodiment. This example is start processing when the image forming apparatus receives from the server a command packet to stand by in the quick start condition. In the meantime, each step is processed by the power supply control unit 418 and the CPU 401 cooperating with each other. The CPU 401 loads a control program from the ROM 403 to the main storage memory 405 and executes the control program to achieve the processing of each step.

According to a packet acquired from the server apparatus 453, start control for bringing the image forming apparatus from the idle condition to the quick start condition is performed as described below. Assume that the apparatus is in a condition (P104) in which only the power supply control unit 418 and the communication control unit 450 of the image forming apparatus are supplied with electric power. In step S101, the communication control unit 450 within the controller control unit 400 determines whether the start packet has been received from the server apparatus 453.

If the communication control unit 450 determines that the start packet has been received (YES in step S101), the communication control unit 450 determines whether the packet is a command packet to stand by in the quick start condition. If so, a quick start flag is raised in the flag resistor 414 and the processing proceeds to step S104. On the other hand, in step S102, if the communication control unit 450 determines that the received packet is not a command packet to stand by in the quick start condition, in step S103, the CPU 401 makes an indication for notifying a user that the operation unit 800 is being initialized.

If the power supply control unit 418 determines that a quick start flag has been raised in step S102, the processing proceeds to step S104. Then, the power supply control unit 418 turns ON the second power supply ON/OFF switching device 415 and the third power supply ON/OFF switching device 417. In step S104, the CPU 401 executes start processing of the controller control unit 400 except the device control unit 407 and the operation portion control unit 406.

In step S105, the CPU 401 determines whether the quick start flag has been raised at the time of the start processing of step S104. When the CPU 401 determines that the quick start flag has been raised, after the processing of step S104 is completed in step S104, in step S107, the system stands by in the quick start condition.

In the quick start condition, the power supply control unit 418 turns OFF the second power supply ON/OFF switching device 415 and the first power supply ON/OFF switching device 412. However, the third power supply ON/OFF switching device 417 is turned ON, so that the main storage memory 405 holds data. Then, when a user turns ON the main switch 420, the image forming apparatus is started quickly.

On the other hand, if in step S105, the CPU 401 determines that no quick start flag has been raised, after step S104, the system enters into a flow (S110) for the remaining start processing, which is not executed in step S104. Next, when the main switch 420 is turned ON, in step S108, the CPU 401 releases energy saving mode and, in step S109, the CPU 401 displays an indication notifying a user that initialization of the operation unit 800 is being executed.

In step S110, the CPU 401 executes the remaining start processing of the device control unit 407, which is not executed in the start processing of step S104. This processing includes any source which generates vibration or impact, for example, a motor and a solenoid necessary for carrying an original document and a sheet or necessary for forming an image.

In step S111, a negotiation between the controller control unit 400 and peripheral devices is executed. For example, the controller control unit 400 acquires information of the peripheral devices and checks to see whether communication is carried out properly.

In step S112, the above-described processing is finished, so that the start processing of the image forming apparatus is completed bringing the image forming apparatus into an idle condition.

Consequently, the startup step of the image forming apparatus after the power is turned on by remote control, can be determined depending on the kind of a packet sent from the server apparatus. As a result, standby electric power of the image forming apparatus which is not consumed immediately can be suppressed. Further, the startup step of the image forming apparatus can be changed depending on a regular condition set by a user. As a consequence, the image forming apparatus can be started in the regular setting made by the user.

In the exemplary embodiment as above described, when a packet for the quick start is received, the quick start processing is always executed. However, such start processing may not be desired depending on a user's environment where the image forming apparatus is shared among users. Therefore, even if the aforementioned packet is received, if a setting for disenabling the packet is made in advance through the operation unit 800, the image forming apparatus may be started without executing the quick start processing. Hereinafter, this exemplary embodiment will be described in detail.

Figure 7A:
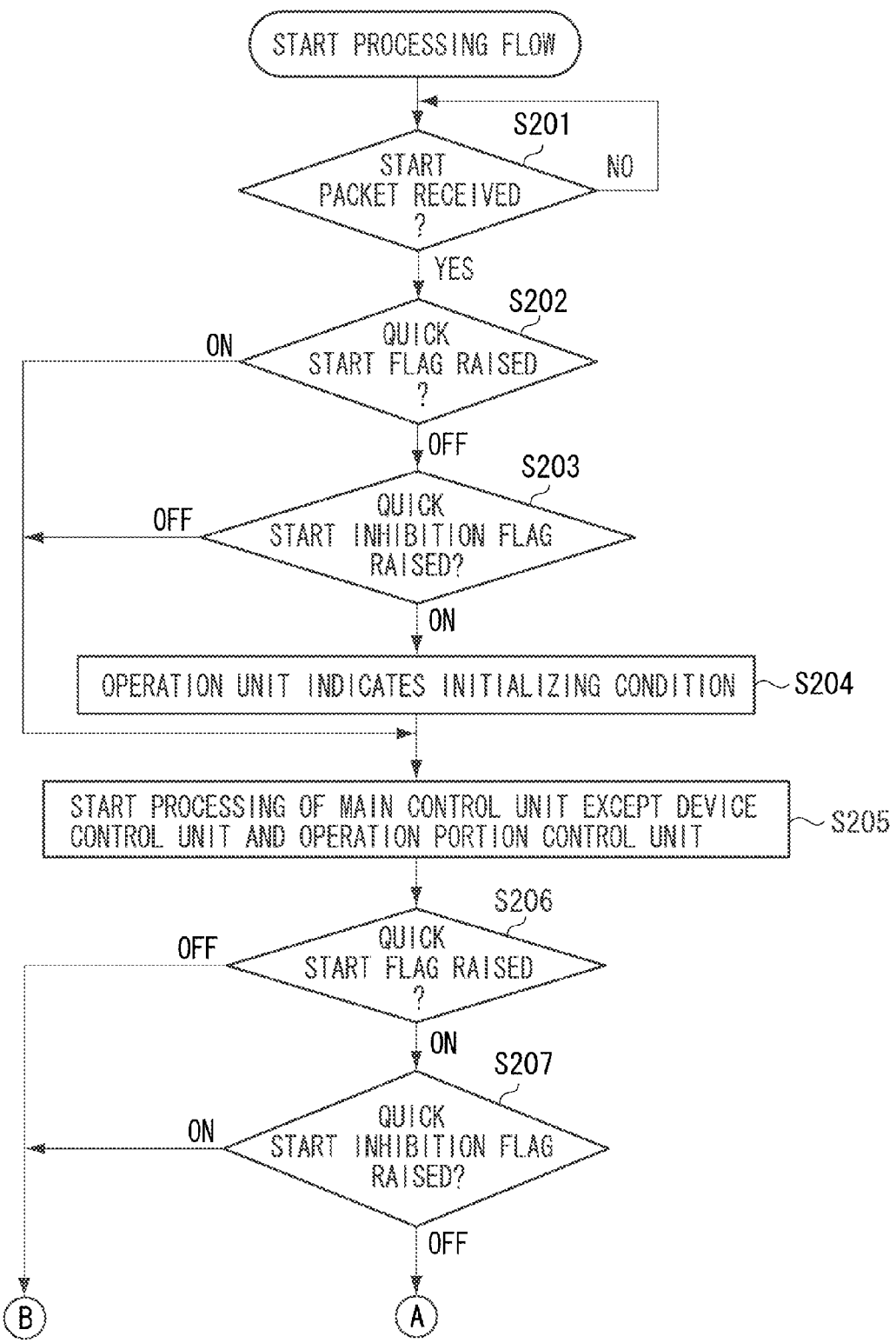

FIG. 7 is a flow chart describing a control method of the image forming apparatus according to a second exemplary embodiment of the present invention. This is start processing example when the image forming apparatus receives an instruction packet to stand by in the quick start condition, from the server. In the meantime, each step is processed by the power supply control unit 418 and the CPU 401 cooperating with each other. The CPU 401 achieves control by loading a control program to the main storage memory 405 and executing it. Start control will be described below which brings the image forming apparatus into the idle condition or the quick start condition by determining an enabled or disenabled state of the setting for restricting the quick start processing, according to a packet acquired from the server apparatus 453.

In the present exemplary embodiment, assume that only the power supply control unit 418 and the communication control unit 450 of the image forming apparatus are supplied with electric power. In step S201, the communication control unit 450 within the controller control unit 400 is in the standby condition waiting for a start packet sent from the server apparatus 453.

When the communication control unit 450 recognizes that the start packet has been received, the communication control unit 450 determines whether the packet is a command packet to standby in the quick start condition. If so, in step S202, the communication control unit 450 raises the quick start flag on a flag register 414 and the processing proceeds to step S205.

On the other hand, in step S202, if the communication control unit 450 determines that no quick start flag has been raised, in step S203, the communication control unit 450 determines whether a quick start inhibition flag for the setting of the image forming apparatus to inhibit the quick start has been raised.

For example, the quick start is carried out together with electricity supply to the main storage memory 405 when the main switch 420 is turned OFF. Accordingly, the quick start inhibition may be set when a user desires to inhibit the electricity supply. If the CPU 401 determines that the quick start inhibition flag has been raised on the main storage memory 405, the processing proceeds to step S204. If the CPU 401 determines that no quick start inhibition flag has been raised, the processing proceeds to step S205. In step S204, the CPU 401 makes an indication to notify a user that initialization of the operation unit 800 is being executed.

In step S205, the power supply control unit 418 turns ON the second power supply ON/OFF switching device 415 and the third power supply ON/OFF switching device 417, and the CPU 401 executes the start processing of the controller control unit except the device control unit 407 and the operation portion control unit 406.

At the time of the start processing in step S205, the CPU 401 determines whether the quick start flag and the quick start inhibition flag have been raised in steps S206 and S207 respectively. If the quick start flag is ON and the quick start inhibition flag is OFF, in step S208, the system stands by for completion of the processing of step S205. Then, after the processing of step S205 is completed, in step S209, the CPU 401 stands by in the quick start condition.

At the time of the quick start condition, the power supply control unit 418 turns OFF the second power supply ON/OFF switching device 415 and the first power supply ON/OFF switching device 412. However, when the third power supply ON/OFF switching device 417 is turned ON, data of the main storage memory 405 is held, so that when a user turns ON the main switch 420, the image forming apparatus is rapidly started.

Next, in step S210, the CPU 401 determines whether releasing of the quick start condition has been instructed when the main switch 420 is turned ON. When the CPU 401 determines that releasing of the quick start condition has been instructed (YES in step S210), in step S211, the CPU 401 makes an indication to inform a user that initialization of the operation unit 800 is being executed.

Next, when the CPU 401 determines that the quick start flag is OFF or the quick start inhibition flag is ON in steps S206 and S207 respectively, in step S212, the system enters into a flow of the remaining start processing, which is not executed in step S205 after step S205. More specifically, the system executes the remaining start processing of the device control unit 407 not executed in the start processing of step S205. This processing includes a source which generates vibration or impact, for example, a motor and a solenoid necessary for carrying an original document and a sheet or necessary for forming an image.

In step S213, a negotiation between the controller control unit 400 and peripheral devices is executed. For example, the controller control unit 400 acquires information of the peripheral devices and checks to see whether communication is executed properly.

When the above-described processing is finished, in step S214, the start processing of the image forming apparatus is completed, so that the image forming apparatus is brought into the idle condition. As a result, in addition to an effect of the first exemplary embodiment, the image forming apparatus may execute start processing convenient to a user.

The respective steps of the present invention may be achieved by a processing apparatus (CPU, processor) of a personal computer executing software (program) acquired through a network or a variety of storage mediums.

Although, in the above exemplary embodiment, upon receiving the start packet, the system is brought from a shutdown condition (P104) to the quick start condition (P103), the present invention is not restricted to this example. For example, according to a modification of the present invention, upon receiving a specific packet, the system may be brought from the shutdown condition (P104) to a sleep condition (P101).

The aforementioned specific packet is transmitted from the server apparatus 453 to start the image forming apparatus. This specific packet is different from the packet for causing the image forming apparatus to execute a specific processing (e.g., print processing, scan processing, data storage processing to an HDD). The specific packet transmitted from this server apparatus 453 is a broadcast packet or a multicast packet.

An operation of the image forming apparatus of this modification will be described with reference to FIG. 8. Assume that the image forming apparatus of this modification is in the shutdown condition in which only the power supply control unit 418 and the communication control unit 450 are supplied with electricity. The communication control unit 450 in the controller control unit 400 is in the standby condition for a specific packet sent from the server apparatus 453.

In step S301, the communication control unit 450 determines whether the specific packet has been received. When the communication control unit 450 determines that any specific packet has been received (YES in step S301), in step S301, the communication control unit 450 raises a flag indicating that the specific packet has been received on the flag register 414.

On the other hand, when the communication control unit 450 determines that other packet than the specific packet has been received (NO instep S301), the communication control unit 450 proceeds with the processing without raising the aforementioned flag on the flag register 414.

Next, the power supply control unit 418 turns ON the second power supply ON/OFF switching device 415 and the third power supply ON/OFF switching device 417. Consequently, the main control unit 410 of the CPU 401 is supplied with electricity. Then, in step S303, the CPU 401 executes the start processing of the main control unit 410. As a result, the power condition of the image forming apparatus turns into the idle condition (P100).

After that, in step S304, the power supply control unit 418 determines whether the specific flag is raised on the flag register 414. When the power supply control unit 418 determines that the specific flag is raised (YES in step S304), in step S305, the CPU 401 executes the sleep transition processing. More specifically, the power supply control unit 418 turns OFF the second power supply ON/OFF switching device 415 and the third power supply ON/OFF switching device 417. Consequently, a supply of electricity to the controller control unit 400 is interrupted. As a result, the power condition of the image forming apparatus turns into the sleep condition (P101).

Figure 8:
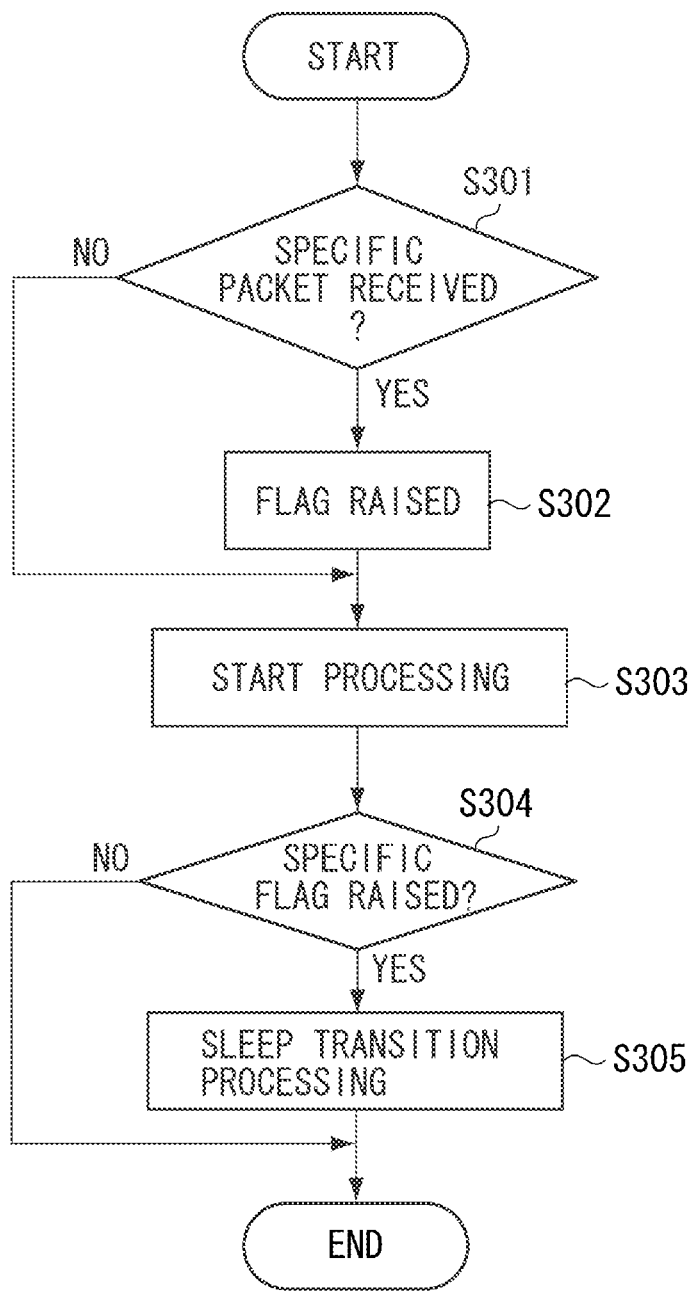
FIG. 8 is a flow chart describing a control method of the image forming apparatus according to a modification of the present invention.

On the other hand, when the power supply control unit 418 determines that no specific flag is raised (NO in step S304), the CPU 401 terminates the flow of FIG. 8 without executing the sleep transition processing.

The above-described modification indicates a shutdown condition in which only the power supply control unit 418 and the communication control unit 450 are supplied with electricity. According to this modification, when a specific packet is received from the server apparatus, the power condition of the image forming apparatus is brought into the sleep condition, and when other packet than the specific packet is received from the server apparatus, the power condition of the image forming apparatus is brought into the idle condition. In a case of receiving the specific packet from the server apparatus, the above modification is not restricted to the sleep condition as long as the power condition of the image forming apparatus is brought from the idle condition to the energy saving condition.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A data processing apparatus capable of communicating with an external apparatus, comprising:
   a receiving unit configured to receive a packet from the external apparatus;
   a determining unit configured to determine whether the packet received by the receiving unit is a first type packet or a second type packet; and a power supply unit configured to, in a case where the determination unit determines that the packet received by the receiving unit is the first type packet, shift the data processing apparatus to a first power condition in which electric power is supplied to a processor and a memory for storing data to be accessed by the processor, and in a case where the determination unit determines that the packet received by the receiving unit is the second type packet, shift the data processing apparatus to a second power condition in which electric power is supplied to the memory and electric power is not supplied to the processor.

2. The data processing apparatus according to claim 1, wherein the second power condition is a state which restricts supply of electric power to components other than the memory which stores data for use in starting the data processing apparatus.

3. The data processing apparatus according to claim 1, wherein, the first power condition consumes more power than the second power condition and is capable of causing the data processing apparatus to execute data processing.

4. The data processing apparatus according to claim 1, further comprising:
a first power supply configured to supply electric power to the receiving unit;
a second power supply configured to supply electric power to the processor; and
a third power supply configured to supply electric power to the memory,
wherein, in a case where the determining unit determines that the packet received by the receiving unit is the second type packet, the power supply unit performs control such that electric power is supplied from the third power supply to the memory,
and, in a case where the determining unit determines that the packet received by the receiving unit is the first type packet, the power supply unit performs control such that electric power is supplied from the second power supply to the processor and electric power is supplied from the third power supply to the memory.

5. The data processing apparatus according to claim 1, further comprising:
a first power supply configured to supply electric power to the power supply unit; and
a switching unit disposed between the first power supply and the receiving unit and configured to switch between supply and shutdown of electric power from the first power supply to the receiving unit.

6. The data processing apparatus according to claim 5, further comprising,
a flag storage unit configured to, in a case where the determining unit determines that the packet received by the receiving unit is the second type packet, store a flag indicating that the second type packet has been received,
wherein in a case where the flag is stored in the flag storage unit, the power supply unit shifts the data processing apparatus to the second power condition.

7. The data processing apparatus according to claim 1, wherein the second type packet is a packet for starting the data processing apparatus.

8. The data processing apparatus according to claim 7, wherein the second type packet is a broadcast packet or a multicast packet.

9. The data processing apparatus according to claim 1, wherein the power supply unit shifts the data processing apparatus to the first power condition if a user turns on a switch in the second power condition.

10. A control method of a data processing apparatus capable of communicating with an external apparatus, the method comprising:
receiving a packet from the external apparatus;
determining whether the received packet is a first type packet or a second type packet;
shifting, in a case where it is determined that the received packet is the first type packet, the data processing apparatus to a first power condition in which electric power is supplied to a processor and a memory for storing data to be accessed by the processor, and in a case where it is determined that the received packet is the second type packet, shift the data processing apparatus to a second power condition in which electric power is supplied to the memory and electric power is not supplied to the processor.

* * * * *